Patented Nov. 22, 1938

2,137,242

UNITED STATES PATENT OFFICE 2,137,242

VARNISH RESINS AND PROCESS OF MAKING SAME

Carleton Ellis, Montclair, N. J., assignor to Ellis-Foster Company, a corporation of New Jersey No Drawing. Application November 15, 1934, Serial No. 753,123

3 Claims. (Cl. 260—4)

This invention relates to the production of phenolic resinous bodies by the reaction of formaldehyde, or other active methylene containing bodies, with xylenols. Furthermore this invention teaches the method of production of such resinous bodies in order that they may be substantially oil-soluble, that is, soluble in drying or semi-drying oils. In this class are included tung oil, linseed oil, perilla oil, and soy bean oil.

This is a continuation in part based on my application Serial 751,867, filed November 24, 1924 Patent No. 1,980,987, Serial 578,219, filed November 30, 1931, Patent No. 2,089,828, and Serial 641,232, filed November 4, 1932 Patent No. 2,087,853. In my application Serial 751,867, there is described the making of xylenol-formaldehyde resins which may be dissolved in a solvent and the solution mixed with fillers to produce molding compositions. In Serial 578,219, use is made of xylenol-aldehyde resins and xylenol-aldehyde resins modified with acetone as ingredients for oil varnishes. In Serial 641,232, oil-soluble xylenol-formaldehyde resins are prepared which may be dissolved in drying oils. The present application deals with changes in the process for making xylenol-formaldehyde resins and also methods of forming various modifications of the same, which modified resins are also oil-soluble.

The xylenols used in the present invention were commercial fractions which contain all six of the isomeric xylenols in various proportions along with smaller quantities of other phenolic bodies which are higher or lower homologues, or derivatives. In the following this complex mixture of xylenols will be termed "mixed xylenols". Chemically the individual xylenols differ vastly in their reactivity with aldehydes. Thus, the xylenol known as 1.3.5.xylenol (symmetrical xylenol) is the most reactive. This is because symmetrical xylenol has a maximum number of vulnerable points at which formaldehyde combines (positions ortho or para to the phenolic group). The least reactive xylenol is the (1)(2,4) xylenol (or perhaps (1)(2,6) xylenol) which has only one reactive position open. Thus, when a resin is formed by reacting, say, 1 mole of formaldehyde with 1 mole of mixed xylenols, the most reactive xylenols tend to combine with a maximum amount of formaldehyde and pass beyond the stage of being readily oil-soluble. At the same time the less reactive xylenols combine only partially or not at all and are largely in a free form at the end of the reaction. Consequently, when the mixed xylenols are treated with enough formaldehyde normally to form a resin, the resulting product is a mixture of resin and unreacted xylenols. Removal of the unreacted xylenols leaves a hard resin that has so great a tendency to heat-harden that it cannot be used in oil varnishes. By proper proportioning of the formaldehyde it is possible to produce an oil-soluble resin; that is, by reacting the mixed xylenols with only enough formaldehyde to react with the more reactive constituents of the mixture to form an oil-soluble resin. The unreacted xylenols are then removed and resinified in a second step as hereinafter described. Aldehydes other than formaldehyde may be used to react with the reactive xylenols.

In the present invention I propose to react mixed xylenols with formaldehyde in the proportions of about one mole of xylenols to one-half mole of formaldehyde, with or without a catalyst. The xylenols which thus react are hereinafter referred to as "more reactive xylenols"; while the xylenols which do not react under these conditions are hereinafter referred to as "less reactive xylenols." The resin mixture so produced is blown with steam and the unreacted xylenols recovered from the condensed steam are still further reacted with formaldehyde in the presence, preferably, of an acid catalyst to produce an oil-soluble resin. The resins produced in these two steps may be fused together. In this way a complete utilization of all the xylenols is effected. After steam distillation the xylenols recovered have been found to be uniformly reactive; that is, they all have approximately the same reaction speed with formaldehyde. Since this is true they may be resinified with normal amounts of aldehyde. Acid catalysts such as hydrochloric acid, sulphuric acid, o-phosphoric acid, acetic acid, and oxalic acid may be used to hasten the reaction. Furthermore, the methods of reaction described in the above mentioned applications may be used and the unreacted xylenols, recovered after steam blowing, used with acid catalysts after the methods of the present invention.

In some cases an alkaline catalyst is preferred. For instance, I may react mixed xylenols or the recovered xylenols referred to above with acetone in the presence of a strong acid. This reaction tends to produce dihydroxydixylyldimethylmethane. This is then further reacted with formaldehyde in the presence of ammonium hydroxide. Light-colored, drying oil-soluble resins are thus obtained using small to large amounts of ammonia.

It may be noted here that the resins obtained by reacting mixed xylenols with formaldehyde are in general fairly light-colored. On exposure to the air they have a tendency to darken and turn a dark brown color. If such resins are first blown with steam until all of the unreacted xylenols, or other unreacted components, are driven off, they exhibit a remarkable stability to air and light, not being affected after a year by such exposure. Hence, the importance of thorough steaming to remove all unreacted xylenols. Furthermore I have found that by fusing the original or steam-blown resin with metallic powders, such as zinc dust, powdered aluminum, or bronze powder, a distinct bleaching action takes place rendering the resins still more air and light stable. The resins may also be dissolved in a suitable solvent and reacted with the metal powder at the boiling point of the solvent.

The following examples are given to illustrate the methods set forth above.

*Example 1.*—2 parts of commercial mixed xylenols (boiling range 210°–225° C.) are refluxed with 1 part of 37% aqueous formaldehyde (1 mole of xylenols to 0.75 mole of formaldehyde) for about 2 hours, or until a well-defined liquid resin-layer appears at the bottom of the reaction vessel. The temperature is then taken to 110° C. and the water distilled off. After the resin has thus been substantially dehydrated, the temperature is taken to 150° C. and the mass is blown with superheated steam. The vapors are condensed and the unreacted phenolic bodies which distil over with the steam are recovered. When these unreacted bodies no longer come over, the distillation is stopped. The unreacted bodies, amounting to about 0.6 part by weight, are collected and reacted in the proportion of 1 mole recovered xylenols to 1 mole of formaldehyde in the presence of 1 per cent of hydrochloric acid. This latter reaction proceeds rather rapidly and when a well-defined resin layer appears at the bottom of the reaction vessel the reaction is stopped. The temperature is raised to 110° C. and the water distilled off. When this latter resin has been dehydrated and steam-distilled to remove acrid bodies, it is mixed with the resin from the first step and fused. The temperature may be taken to about 200° C. When cooled to room temperature the final resin is light-colored, hard and brittle. It possesses little or no odor and is readily soluble in tung oil.

In the first step of the operation as described above, no catalyst is used. However, by cutting down on the amount of formaldehyde faster reaction is secured with an acid catalyst. By using less formaldehyde the resin which forms remains dissolved in the excess unreacted xylenols, giving a homogeneous viscous product. The unreacted xylenols are then removed by steam distillation.

*Example 2.*—3 parts of commercial xylenols (boiling range 210°–225° C.) are mixed with 1 part of 37 per cent aqueous formaldehyde and 1 per cent of concentrated hydrochloric acid and boiled in a vessel fitted with a reflux condenser for about one hour, or until a well-defined layer is formed at the bottom of the reaction flask. The temperature is taken to 110° C. and the water distilled. After the resin has been dehydrated it is blown with steam and the recovered, unreacted xylenols (about 1½ parts) heated with formaldehyde as in Example 1.

*Example 3.*—5 parts of commercial xylenols (boiling range 205°–220° C.) are mixed with 1 part of 37 per cent aqueous formaldehyde and 0.2 per cent of oxalic acid. Refluxing is allowed to take place for about 2 hours. The liquid product is then dehydrated by distilling off the water at 110° C. and is then blown with steam. The unreacted xylenols recovered from the condensed steam are then reacted with formaldehyde in the same proportions as the first step of Example 1 with the exception that 3 per cent of oxalic acid is used to catalyze the reaction. The resin from this second step is dehydrated by heating it to about 120° C. and the resin from the first step, that from the second step and 1 per cent of zinc dust are fused together at a temperature of 200° C. When cooled to room temperature, the resin is light in color, hard and brittle. It possesses little or no odor and is readily soluble in tung oil to form a light-colored, quick-drying varnish base.

Commercial mixed xylenols, or crude cresylic acid, may be reacted with even less formaldehyde than used in the above example, the resin dehydrated, then the excess xylenols removed by distillation at atmospheric pressure or under reduced pressures, as shown below.

*Example 4.*—10 parts of commercial mixed xylenols are mixed with 1 part of 37 per cent aqueous formaldehyde and 0.1 part of ortho-phosphoric acid and refluxed for 2 hours. At the end of this time the water is distilled off and the liquid mixture distilled at atmospheric pressure. The temperature is finally taken to 240° C. The residue left in the distilling flask is a hard, brittle, asphalt-like resin. This resin is readily soluble in all the drying oils. The recovered xylenols may be resinified with formaldehyde according to the procedures of the previous examples.

Besides making an oil-soluble resin according to the above method, I may react commercial mixed xylenols, or recovered unreacted xylenols, with varying amounts of tung oil before resinifying with an aldehyde. In this way what appears to be a chemical combination is secured between the drying oil and phenolic resin. These products dry less rapidly than varnishes made by dissolving xylenol-aldehyde resins in a drying oil. The amount of drying oil combined may be varied, depending on the type and hardness of the resin desired.

*Example 5.*—2 parts of raw tung oil, 1 part of mixed commercial, or recovered, xylenols and 4 per cent of ortho-phosphoric acid (based on the xylenols) are heated together in a vessel fitted with an air-reflux condenser to a temperature of about 150° C. for 1 to 4 hours. The reaction product is then mixed with 0.6 part of 37 per cent aqueous formaldehyde and refluxing is continued with a water-cooled condenser for 2 hours. At the end of this time the water is distilled off and the temperature taken to 260°–270° C. in order to body the product to the desired consistency.

*Example 6.*—3 parts of raw tung oil, 1 part of mixed commercial (or recovered) xylenols and 4 per cent of ortho-phosphoric acid are mixed and heated in a kettle provided with a reflux condenser for 2 hours at 180° C. This reaction product is then washed free of acid with slightly alkaline water. 600 grams of 37 per cent aqueous formaldehyde and sufficient 25 per cent aqueous ammonia to form hexamethylenetetramine are added to the reaction product. Refluxing is allowed to take place for 2 hours, then the product dehydrated and the temperature carried to 260°–270° C. to body the varnish base to the desired consistency.

When mixed commercial xylenols are resinified with formaldehyde in the presence of a basic catalyst such as caustic soda, potassium hydroxide or carbonate, the reaction often becomes unmanageably violent with a tendency to produce heat-hardening products which are, in general, insoluble in drying oils. The recovered xylenols from the above described two-step process are more evenly reactive and may be resinified in the presence of a basic catalyst. When using a basic catalyst, I prefer to subsequently flux the resinous product obtained with rosin or ester gum to secure complete oil-solubility.

During the drying of a varnish film containing an unmodified phenol-aldehyde there is usually a tendency for the development of a yellow coloration even when the varnish itself is light in color. Fluxing a completely oil-soluble xylenol resin with a small amount of rosin or a rosin ester considerably lightens the color of the dried varnish film. It is to be understood that this fluxing with rosin, or rosin ester, is in no way connected with the oil-solubility, but that the rosin merely serves as an agent which reduces after-yellowing of the varnish film. In place of rosin there may be used the various other natural and fossil resins and their esters. A modicum of such resins will usually serve the purpose, amounts ranging from 10 per cent to 30 per cent. Lactic acid has a similar effect. Furthermore, this after-yellowing may be prevented by irradiating the varnish film or varnish with ultra-violet light or natural sunlight. Another convenient method of producing a pale varnish film is to acylate the xylenol resin before dissolving the resin in the drying oil. For example, a xylenol-formaldehyde resin can be dissolved in aqueous sodium hydroxide. Gradual addition of benzoyl chloride causes the precipitation of a light-brown powder. A varnish made from the benzoylated resin and tung oil dries pale colored with no after-yellowing.

In general the oil-soluble xylenol resins formed from xylenol and aldehydes are readily soluble in caustic soda solution. This is not an altogether desirable feature. However, by heating the resin with glycerol (about 10 per cent) the resin is no longer soluble in dilute or concentrated caustic soda solutions. A varnish made from the glycerol-treated resin and tung oil dries slightly faster than one made from untreated xylenol resin.

Xylenol-formaldehyde resins, whether made from a two-step process or not, have varying degrees of solubility in tung oil. Solubility depends to some measure upon how far the reaction has been allowed to proceed, the proportions of the reactants and the type of catalyst used. Thus, many resins made from xylenols and formaldehyde in the presence of an acid catalyst are insoluble in tung oil; others are partially soluble and still others are readily soluble. The resins described in the above examples are entirely soluble. By heating a difficultly soluble xylenol-formaldehyde resin with maleic acid or anhydride, the resin so treated becomes very readily soluble in tung oil. Xylenol resins which are already soluble in tung oil may be rendered more soluble by this maleic acid treatment.

*Example 7.*—5 parts of a xylenol-formaldehyde resin are heated with 1 part of maleic acid to 200° C. The mixture turns initially an orange-red color, but as heating progresses this color lightens to a pale brown. When all foaming ceases the resin is cooled down. At room temperature it is clear, hard, brittle and very readily soluble in tung oil.

*Example 8.*—The procedure of Example 7 may be varied by using the maleic acid as a reaction catalyst. 2 parts of mixed commercial xylenols, or recovered xylenols, are mixed with 1 part of 37 per cent aqueous formaldehyde and 2 per cent of maleic acid based on the xylenols. The mixture is refluxed until a well-defined resin layer forms on the bottom of the reaction vessel, leaving a clear supernatant water layer. The water is then distilled off and the resin hardened by slowly heating to 200°–210° C. When cooled to room temperature, the resin is light in color, hard, brittle and very readily soluble in tung oil.

Xylenol-formaldehyde products are resins which not only have the property of dissolving in tung oil, they also possess the property of being solvents for tung oil and other drying oils. A composition that can be used as a shellac substitute may be made by dissolving small amounts of tung oil in xylenol resins.

*Example 9.*—2 parts of an oil-soluble xylenol-formaldehyde resin made according to any of the foregoing examples are heated with 1 part of tung oil to 260°–270° C. for about 15 minutes. The oil dissolves readily in the molten resin to form a clear solution. When cooled to room temperature the resin is hard and brittle although it contains one-third oil. It may be dissolved in a suitable solvent such as alcohol and toluol. A film dries lacquer-like, non-tacky and hard. It air-oxidizes in time so as to become insoluble.

Most of the xylenol-formaldehyde resins as described above are either insoluble or difficultly soluble in drying oils other than tung oil (in which they are readily soluble when made by the preferred procedure as above outlined). Solubility in drying oils is here meant solubility in the proportions generally used in varnish making, which proportions may range from about ¾ part oil to 1 part resin (by weight) to, say, 4 parts oil to 1 part resin (or higher). This fact in itself may seem limiting; however, this is not the case, for any xylenol resin which is soluble in tung oil can also be made readily soluble in linseed oil and other drying oils. The best method to effect solution of a xylenol-formaldehyde resin in linseed oil is to first fuse the resin with a small proportion of linseed oil. As stated above, fusible xylenol-formaldehyde resins are excellent solvents for all drying oils, in general, as well as for tung oil in particular, that is, drying oils are soluble in the resins. The resin from Example 9, for instance, is soluble in all of the drying oils. Smaller amounts of drying oil then described in Example 9 may be used to secure ready solubility. This method is recommended to improve the solubility of xylenol-aldehyde resins which are difficultly soluble. Resins obtained from the lower-boiling fractions of cresylic acid are, in general, difficultly soluble in drying oils. If, however, they are first fused with a modicum of tung oil, their solubility becomes excellent by this treatment.

*Example 10.*—A permanently fusible cresol resin is made by refluxing together 2 parts by weight of meta-para-cresol and 1 part by weight of 37 per cent aqueous formaldehyde in the presence of 3 per cent of oxalic acid until a well-defined supernatant water-layer appears. Refluxing is continued for about 20 minutes after the water-layer appears. The water-layer is decanted and the resin is dehydrated by vacuum-distillation. Two parts by weight of this resin are fused with 1 part of raw tung oil. The temperature is taken to 230°–250° C. and, when the oil has dissolved completely in the resin and the mixture becomes clear, it is cooled to room temperature. The modified resin is light-colored, hard, brittle and very readily soluble in tung oil.

Example 11.—The xylenol-formaldehyde of Example 1 is insoluble in linseed oil. However, a solution of the resin in the latter oil can be made by first fusing the resin with linseed oil in the proportion of 2 parts of resin to 1 part of linseed oil. The temperature is taken to 280°–290° C. until a clear melt results. When cooled to room temperature the oil-modified resin is light colored, hard, brittle and very readily soluble in linseed, perilla, soya bean, or any of the other drying or semi-drying oils.

In this last example any form of linseed oil may be employed. For instance, raw linseed oil, bodied or blown linseed, or mixtures of linseed with tung or other drying oils. Furthermore, other drying oils may be employed in place of linseed. They all yield resins substantially the same as regards solubility, color, hardness, etc.

For the production of oil-soluble xylenol-formaldehyde resins the procedure of Example 1 is preferably followed. A part of the xylenol may be replaced by a small amount of other phenols such as phenol or cresol and oil-soluble resins result, but not if susbtantial proportions of the lower phenols are used. However, if larger amounts of such phenols are used and the resulting resins are worked up in accordance with the methods of Examples 10 and 11, completely oil-soluble resins result. Also, halogenated phenols such as p-chlorophenol may be co-condensed with xylenol and formaldehyde to produce readily oil-soluble resins. Such compounds have the property of tempering the reaction between commercial mixed xylenols and formaldehyde.

Example 12.—60 parts of commercial mixed xylenols and 20 parts of para-chlorophenol are refluxed with 55 parts of 37 per cent aqueous formaldehyde containing 3 per cent of acetic acid for 2 hours. The speed of the reaction is cut down considerably by the presence of the chlorophenol. The supernatant water layer is decanted and the resin dehydrated. Finally the resin is fused at a temperature of 200° C. When cooled to room temperature the resin is of light-brown color, hard, brittle and readily soluble in tung oil.

It has further been found that resins from halogenated xylenols possess great oil-solubility. Films of varnishes made from these resins are characterized by their light color when dry, that is, absence of after-yellowing. Such results may also be obtained by halogenating the resin after it has been made. The varnishes made from these resins are substantially more fire-retardant and fireproof than varnishes made from unhalogenated resins. In general, I prefer to carry out halogenation until about 0.75 to 1 atom of the halogen has combined with 1 molecule of xylenol. The halogenation is usually carried out in the absence of light or other halogenation catalyst. For instance, I may saturate water with chlorine gas and then agitate this solution with a small amount of mixed xylenols in the dark. The reaction under such circumstances is almost instantaneous. In general, the halogenated xylenols are dark in color but may be lightened by distillation, preferably in the absence of oxygen since they are somewhat oxidizable at high temperatures.

Halogenation of xylenols reduces the number of adehyde-reactive positions in the molecule. Hence it produces a mixture of less reactive xylenols from the mixed commercial xylenols and resinification of halogenated xylenols and formaldehyde is comparable to resinification of the unreacted xylenols recovered by steam-distillation as in Example 1.

Example 13.—40 parts of oil-soluble xylenol-formaldehyde resin made according to Example 1 are dissolved in carbon tetrachloride and 2 to 3 percent of iodine added. Chlorine gas is passed through the solution until an amount equal to 1 atom of chlorine for each xylenol molecule has been taken up, i. e., about 10 parts. The solvent is distilled off. The resulting resin is darker in color than the unchlorinated resin and is very readily oil-soluble.

Example 14.—164 parts of xylenols (boiling range 213°–215° C.) are mixed with 4 parts of anhydrous aluminum chloride and chlorine gas is passed through the mixture in the absence of light until there is a gain of 30 parts in weight. The xylenols are then washed repeatedly with slightly alkaline water to free them from salts, acid and excess chlorine. The chlorinated xylenols, which are a dark purple-red, are distilled and the fraction boiling between 213° and 230° C. collected. One mole of this distillate is refluxed with 0.75 mole of 37 per cent aqueous formaldehyde in the presence of 3 per cent of oxalic acid as catalyst. The reaction proceeds slowly. After refluxing for 2½ hours the supernatant water is decanted and the liquid resin heated at atmospheric pressure to 120° C. to dehydrate it. The temperature is finally taken to 200° C. The resulting resin at room temperature is dark-colored, brittle and readily soluble in tung oil.

In general the varnishes produced with the resin described in Example 14 are dark in color, drying to dark-colored films. However, by the following procedure they may be made light-colored and the films extremely pale.

Example 15.—One part by weight of the resin from Example 14 is heated with 2 parts by weight of raw tung oil to 260° C. and the temperature held at this point until the oil-resin mixture has become sufficiently bodied. The varnish base at this stage is very dark colored. Five per cent of lead naphthenate or litharge is then added. A precipitate immediately forms with simultaneous lightening of the oil mixture to a pale tan. As heating is continued this precipitate redissolves, the oil-base remaining very light colored. Finally 1 per cent of cobalt, or manganese drier is added and the varnish base cooled. When made into a varnish with suitable solvents, a film dries hard and colorless.

Although the use of xylenol resins in oil varnishes has been stressed in the foregoing, it has been found that other useful products can be obtained by condensing mixed xylenols with formaldehyde in the presence of a basic catalyst, then mixing such a resin with filler, tung oil, and so forth, and baking to an exceptionally hard cement-like mass.

Example 16.—One mole mixed commercial xylenols are refluxed with 2 moles of aqueous formaldehyde in the presence of an alkaline catalyst such as sodium carbonate. The reaction is allowed to proceed just far enough so that a distinct clear supernatant water-layer is formed. This water-layer is removed and the resin dehydrated by vacuum drying. This liquid resin is mixed with about 40 per cent of ground wood filler and 10 to 20 per cent of tung oil. The mixture is of a putty consistency and in that form may be pressed into molds and baked in an oven at about 90° C. to a hard product.

*Example 17.*—3 parts of commercial mixed xylenols or recovered xylenols are heated with 4 parts of 37 per cent aqueous formaldehyde and about 1 per cent of caustic soda to just below boiling temperature for 1 hour. The supernatant water is poured off and the liquid resin dehydrated. When in the form of a slightly viscous liquid at room temperature it is mixed with enough raw Turkey umber or iron oxide to bring it to a putty-like consistency. About 5 per cent of hexamethylenetetramine is mixed in the mass and it is cast into forms. By baking it at 75° C. for from 48 to 100 hours a solid, homogeneous product is obtained which is exceedingly strong. Tung oil may be dissolved in the resin to give it additional toughness.

What I claim is:

1. The process of forming an oil-soluble xylenol-aldehyde resin consisting in reacting formaldehyde and mixed xylenols in the proportion of 1 mole of formaldehyde to more than 1 mole of xylenols, separating the unreacted xylenols from the resin thus formed, reacting the xylenols thus recovered with formaldehyde in the proportion of about 1 mole of formaldehyde to 1 mole of xylenols, and mixing the resin from the second reaction with the resin from the first reaction.

2. The process of producing condensation products which comprises reacting a mixture of xylenols with formaldehyde insufficient to give condensation products with all of the xylenols, separating unreacted xylenol and reacting the latter with formaldehyde to give an oil-soluble condensation product.

3. The process of producing condensation products which comprises halogenating a condensation product of formaldehyde and a xylenol.

CARLETON ELLIS.